March 21, 1944.  W. O. MARTIN  2,344,714
REVERSING VALVE
Filed Feb. 18, 1942
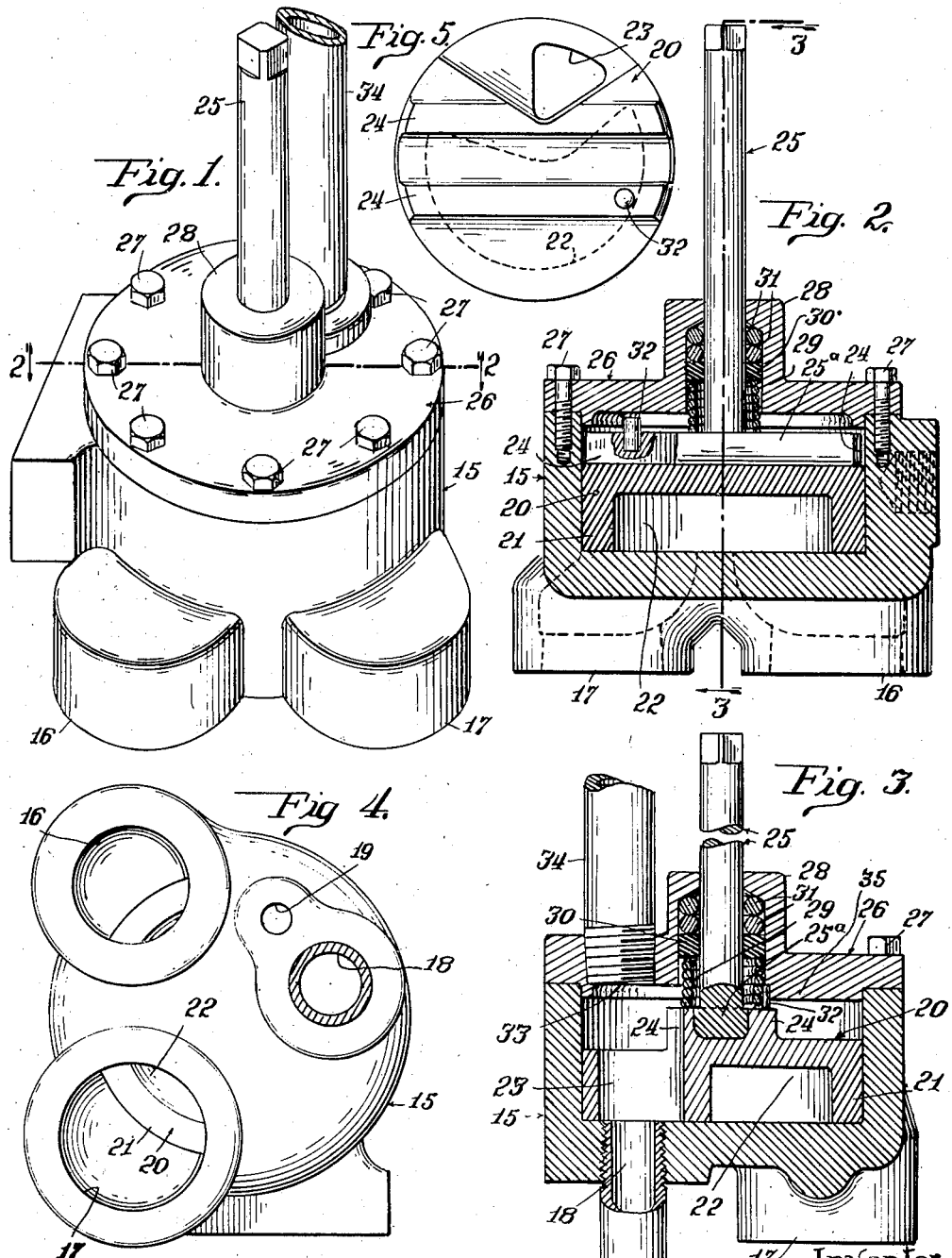
Inventor
William O. Martin,
By George Heideman
Attorney.

Patented Mar. 21, 1944

2,344,714

UNITED STATES PATENT OFFICE 2,344,714

REVERSING VALVE

William O. Martin, Fort Smith, Ark., assignor to William O. Martin, Inc., Fort Smith, Ark., a corporation of Arkansas Application February 18, 1942, Serial No. 431,377

1 Claim. (Cl. 251—87)

My invention relates to reversing valves more especially intended for the fluid or steam operated engines employed in operating the stokers of locomotives, although equally applicable for use with hoisting or dredge engines; the invention having for its object the provision of a comparatively simple and inexpensive device having only one moving part or element and eliminating the use of packing rings and the like.

Another object of the invention is the provision of a valve whereby the ports in the valve-seat to both the engine exhaust and live steam connections will be blocked off when the rotary valve is in neutral position and all condensate in the live steam line to the engine will be blown out through a blow-out port in the valve instead of through the engine valves and cylinders; and also, in the event the reversing valve should be accidentally moved to neutral position, or left in that position, and steam is turned on to the engine this fact will be immediately known by a "warning" produced by the steam blowing through the "blow-out" port; in addition to that fact, with the valve in neutral position, the steam or other medium will be blown out through the blow-out or warning port thereby preventing the destruction of lubrication and eliminating the harmful effects of forcing or working water through the cylinders and valves.

The above mentioned objects and advantages, as well as other advantages inherent in the invention, will all be readily comprehended from the detailed description of the accompanying drawing wherein:

Figure 1 is a perspective view of my improved reversing valve.

Figure 2 is a cross sectional view taken substantially on the line 2—2 of Figure 1 in the direction of the arrows.

Figure 3 is a vertical sectional view taken on the line 3—3 of Figure 2 in the direction of the arrows.

Figure 4 is an inverted plan view of the valve housing.

Figure 5 is a top plan view of the rotary valve.

Although my improved reversing valve is applicable for use in connection with fluid or steam operated engines, such as hoisting or dredge engines, it is especially adapted for stoker operating engines as employed on locomotives and in the particular exemplification consists of the outer body or housing 15 provided on its bottom with ports 16, 17, 18 and a small port 19, all of which communicate with the valve holding chamber in the housing.

The housing is provided with a rotary valve 20 provided with an annular peripheral wall 21 which seats on the bottom of the chamber in the housing, see Figure 2, and the lower face of the valve is provided with a sectoral cavity disposed throughout a major portion of the lower face of the valve as shown at 22 in Figure 5. The valve 20 at one side beyond the cavity 22 preferably is increased in thickness and provided with a sectoral port 23, see Figure 5. The upper face of the valve 20 is provided with spaced apart and parallelly arranged ribs 24, 24 disposed transversely of the valve to provide a channel or groove therebetween.

The valve 20 is rotated by means of a T-shape stem 25, whose head or transversely disposed lower end 25ᵃ seats in the channel or groove between the ribs 24, 24, see Figure 2; the outer end of stem 25 being adapted to have a suitable hand wheel or hand-grasp, not shown.

The housing 15 is provided with a removable cover or cap 26 secured in place by cap screws or bolts 27. The center of the cap is provided with a boss portion or stuffing box 28 containing a coil spring 29 whose lower end seats on the head 25ᵃ of the valve stem while the upper end is provided with a collar 30, above which are suitable packing rings 31.

In order to prevent rotation of the valve 20 beyond predetermined limits, I provide it with an upstanding dowel pin or stud as at 32, see Figures 2 and 5. No packing rings are employed for the rotary valve 20. The cap 26 formed to provide a chamber above the valve 20 is provided with an admission port 33 and in operation live steam from the boiler or suitable source of supply is conveyed by pipe 34, to port 33 and passes directly through rotary valve port 23 and through the outlet port 18 to the engine or coal pusher of the stoker; while the exhaust from the engine or coal pusher passes through the port 16 and into the cavity 22 on the lower side of the rotary valve 20 from whence it is discharged to atmosphere through port 17.

In reverse operation, live steam entering port 33, enters the chamber above the valve, passes through the port 23 in the rotary valve 20 and thence through port 16 of the valve body or housing and to the cylinders of the engine or coal pusher. When valve port 23 is in register with port 16, the sectoral cavity 22 will register with ports 18 and 17. The exhaust from the engine cylinders then passes through a pipe connected with the port 18 in the body, through the cavity 22 in the lower face of the rotary valve 20 and out through the port 17, in the body or housing, to atmosphere.

When the rotary valve 20 is in neutral position, namely with the operating handle (not shown but arranged on the operating stem 25) midway between operating position and reverse position, the outlets or ports 18 and 16 in the valve housing will be covered or closed and the port 19 will then be open, permitting all condensate to exhaust through the "blow-out" or warning port 19 instead of through the cylinders and valves of the stoker engine, or through the coal pusher cylinders, thereby preventing destruction of lubrication to said elements and eliminating the harmful effects of working water through the cylinders and valves. Then too, in the event the reversing valve is accidentally moved to neutral position, its position will be indicated by a steam blow or exhaust at the warning port 19 and prevent stoker or engine failure.

In reverse position, steam will come through port 33, opening 23 in the rotary valve 20, and through port 16, admitting live steam at opposite edges of the engine valves and change the engine from an inside to an outside admission, thereby changing the direction of rotation of the crankshaft. The exhaust from the engine at that time passes into the bottom port 18 in the valve housing, through the valve cavity 22 and out through port 17 to atmosphere. As previously stated, with my improved valve, when rotated to a position between running and reverse positions, the outlets or ports 16 and 18 will be shut off against passage of live steam, while the sectoral port 23 will register with port 19 and permit the live steam to blow out of port 19, and act as a warning because of discharging steam.

The cover 26 on its lower face is provided either with an arcuate groove or with a rib or enlargement as at 35 for engagement by the stud or pin 32 whereby the maximum positions of valve 20 are determined; the maximum positions being approximately ninety degrees apart, with neutral position approximately half way between, at which time all ports (except port 19) in the housing bottom will be blanked out against the passage of live steam from port 33 while port 23 in the valve will register with port 19 in the bottom of housing 15.

The depth of the valve holding chamber in housing 15 is greater than the thickness of valve 20 so as to provide a pressure fluid receiving space between the valve 20 and cover 26; the valve 20 being maintained on the bottom of the housing chamber by the spring 29.

The exemplification shown and described is believed to be the simplest and best embodiment of the invention adapted for use with any suitable pressure medium, but modifications may be possible without, however, departing from the spirit of my invention as defined in the appended claim.

What I claim is:

A reversing valve of the character described comprising a substantially annular housing provided with four spaced ports in its bottom; two of the ports being arranged at one side of the transverse center of the housing, one of said two ports being adapted to have connection with a source of pressure medium while the other port communicates with the atmosphere; the other two ports being arranged on the other side of the transverse center of the housing, one of the last mentioned pair of ports being adapted to have connection with a source of pressure medium, while the other port of said pair communicates with the atmosphere and constitutes a blow-out and warning port; a removable top plate for the housing provided with a central operating stem receiving opening and an admission port at one side of the plate center in alignment with the first port of the last mentioned pair of ports; a rotatable valve located in the housing in spaced relation with the top plate, provided on its upper surface with a transverse channel at one side of its transverse median line with a sectoral port extending from top to bottom and with a large sectoral cavity on its lower face extending to opposite sides of the transverse median line, the sectoral port being adapted to establish communication between the admission port of the top plate and the first port of the second mentioned pair of ports in the bottom of the valve housing when the valve is in one position and the sectoral cavity of the valve will be in communication with both ports of the first mentioned pair of ports in the housing bottom, while the sectoral port of the valve will be in communication with the first port of the first mentioned housing ports when the valve is rotated to reverse position at which time said sectoral cavity will establish communication between the first port of the second mentioned pair of housing ports and the second port of the first mentioned pair, while communication with the blow-out and warning port is established when the valve is in neutral position; means whereby rotation of the valve beyond a predetermined degree is prevented; and an inverted T-shape valve operating stem disposed through the central opening in the top plate with its head arranged in the transverse channel on the upper face of said disc valve whereby the latter is operated when the stem is rotated.

WILLIAM O. MARTIN.